Figure 1:
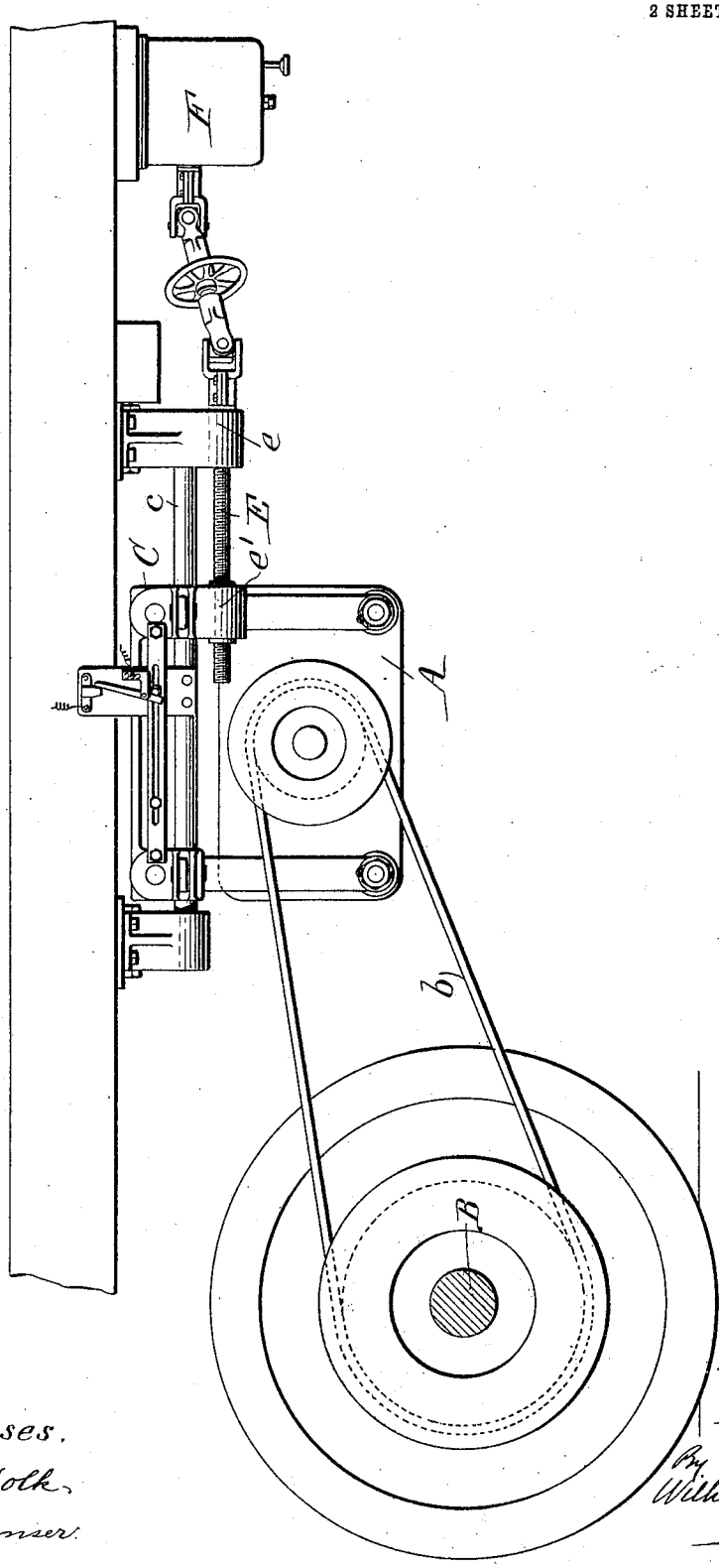

No. 761,012. PATENTED MAY 24, 1904.
M. R. SHEDD.
AUTOMATIC REGULATOR FOR ELECTRIC GENERATORS.
APPLICATION FILED SEPT. 8, 1903.
NO MODEL. 2 SHEETS—SHEET 1.

Witnesses.
E. A. Volk.
R. W. Runser.

M. R. Shedd.
Inventor.
By Wilhelm Bonner
Attorneys.

No. 761,012. PATENTED MAY 24, 1904.
M. R. SHEDD.
AUTOMATIC REGULATOR FOR ELECTRIC GENERATORS.
APPLICATION FILED SEPT. 8, 1903.
NO MODEL. 2 SHEETS—SHEET 2.
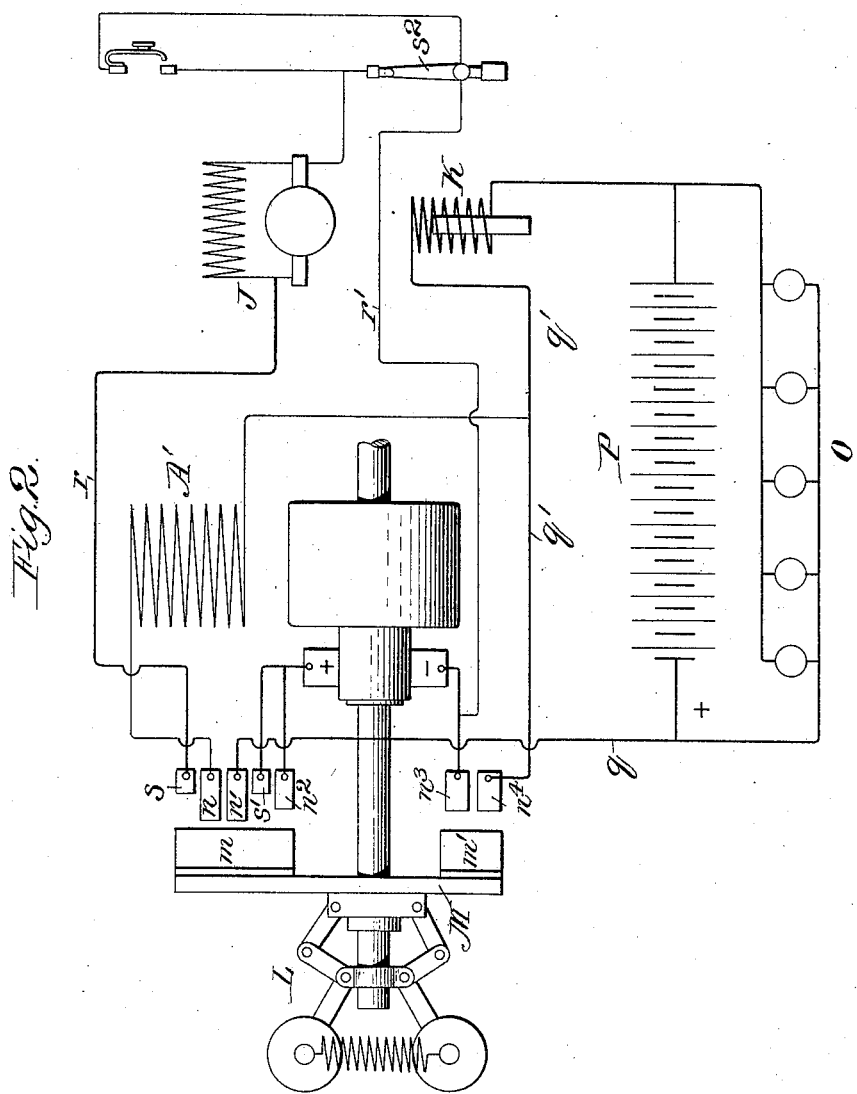

No. 761,012.                                               Patented May 24, 1904.

UNITED STATES PATENT OFFICE.

MARCELLUS R. SHEDD, OF LANCASTER, NEW YORK, ASSIGNOR TO CHARLES M. GOULD, OF NEW YORK, N. Y.

AUTOMATIC REGULATOR FOR ELECTRIC GENERATORS.

SPECIFICATION forming part of Letters Patent No. 761,012, dated May 24, 1904.

Application filed September 8, 1903. Serial No. 172,308. (No model.)

*To all whom it may concern:*

Be it known that I, MARCELLUS R. SHEDD, a citizen of the United States, residing at Lancaster, in the county of Erie and State of New York, have invented new and useful Improvements in Automatic Regulators for Electric Generators, of which the following is a specification.

This invention relates to an automatic regulator for electric generators, and is more particularly directed to improvements in the regulator described in United States Letters Patent No. 705,487, granted to William A. Turbayne July 22, 1902, in connection with an electric-lighting apparatus for railway-cars in which the electric current is generated by a dynamo driven from one of the car-axles by a belt or the like. As the speed of the car-axle has a considerable range of variation in the ordinary use of the car, it is desirable in order to maintain a practically constant output of the dynamo to drive its armature at a practically constant speed. Briefly stated, this is accomplished in the apparatus described in said patent as follows: The dynamo is movably mounted and is shifted toward and from the driving-axle to slacken or tighten the driving-belt and decrease or increase the speed of the dynamo by a shifting-screw operated by an electric motor. The motor is operated by a current generated by the dynamo, and a solenoid controlled by a current generated by the dynamo operates a reversing device to cause the shifting-screw to turn in one or the other direction. When the speed of the driving-axle and dynamo is not sufficient for the dynamo to generate a current of normal strength, the core of the solenoid drops by gravity and actuates the reversing device to rotate the shifting-screw in the direction to shift the dynamo away from the driving-axle, thereby tightening the belt and increasing the speed and output of the dynamo. If the output of the dynamo is increased beyond the normal or desired value, the energization of the solenoid-core is increased and the core raised to operate the reversing device to cause the shifting-screw to rotate in the opposite direction and shift the dynamo toward the driving-axle, thereby slackening the belt and decreasing the speed of the dynamo and reducing its output to the normal. The electric circuits for operating the motor and solenoid are controlled by a circuit-closer operated by a centrifugal governor on the dynamo-shaft. In said patented apparatus the motor-circuit is closed and sets the motor in operation at or about the time the dynamo commences to generate a current, which is objectionable, especially when the car moves slowly for a considerable distance, as the dynamo is shifted away from the driving-axle and the belt unduly tightened without increasing the speed of the dynamo sufficiently to produce the desired output.

The object of this invention is to avoid this unnecessary operation of the motor and tightening of the belt, and to this end the motor-circuit is not closed until the dynamo is driven at nearly the normal speed.

In the accompanying drawings, consisting of two sheets, Figure 1 is a side elevation, partly in section, of an apparatus embodying the invention. Fig. 2 is a diagrammatic view showing the electrical connections.

Like letters of reference refer to like parts in both figures.

A represents the dynamo, B the driving car-axle, and *b* the driving-belt which runs around pulleys on the car-axle and dynamo armature-shaft to drive the latter. The dynamo is hung from a carriage C, which travels toward and from the car-axle on tracks *c*, suspended below the car-bottom.

E represents the shifting screw-shaft, which is journaled in a suitable bearing *e* and has its threaded portion engaging in a screw-threaded opening in a lug *e'* on the dynamo-carriage.

The operating mechanism and reversing device for the screw-shaft, including the motor and solenoid, are inclosed in the casing F, supported on the car, and are substantially the same in construction and operation as the corresponding parts described in said patent.

Referring to Fig. 2, J and K represent, respectively, the electric motor for driving the shifting-screw, and the solenoid for operating the reversing device. L represents the centrifugal governor, and M a movable switch-arm operated by the governor and provided with switch-blades $m$ $m'$. $n$ $n'$ $n^2$ $n^3$ $n^4$ are contact-plates arranged opposite to the switch-blades $m$ $m'$. O represents the lamps or other translating devices, and P the storage battery for maintaining the lights when the dynamo is out of action or is not running at a sufficient speed for the desired voltage. When the dynamo-shaft reaches a predetermined desired speed, the centrifugal governor is operated to move the switch-blade $m$ against the contacts $n$ $n'$, which project nearer to the switch-arm than the other contacts. The battery-current then flows from the positive pole of the battery through wire $q$, contact $n'$, switch-blade $m$, contact $n$, field-winding $A'$ of the dynamo, wire $q'$, and coil of the solenoid K back to the negative pole of the battery, thus energizing the dynamo-field. As the speed of the dynamo-shaft quickens the centrifugal governor throws the blades $m$ $m'$ of the switch-arm against the contact-plates $n^2$ $n^3$ $n^4$. The current generated by the dynamo then flows from the positive brush of the dynamo through contact $n^2$, switch-blade $m$, contact $n'$, wire $q$ to the battery P and lights O and back through the coil of the solenoid K, wire $q'$, contact $n^4$, switch-blade $m'$, contact $n^3$ to the negative brush of the dynamo. Current also flows from the positive brush of the dynamo through contact $n^2$, switch-blade $m$, contact $n$, field $A'$ of the dynamo, wire $q'$, contact $n^4$, switch-blade $m'$, contact $n^3$ back to negative brush of the dynamo. The speed of the dynamo and its output increase with the speed of the driving-axle, and somewhat before the normal desired output is attained the centrifugal governor moves the switch-arm, with its blade $m$, into engagement with two contacts $s$ $s'$, included in the motor-circuit $r$ $r'$. The motor-circuit is thus closed, and current from the dynamo flows from the positive brush through contact $s'$, wire $r$, motor J, switch $s^2$, and wire $r'$ back to the negative brush of the dynamo. This current sets the motor in operation and rotates the shifting-screw through the shifting mechanism. At this time the solenoid-core is down, and the reversing device actuated thereby causes the screw-shaft to turn in the direction to shift the dynamo away from the car-axle, thereby tightening the belt and quickly increasing the speed of the dynamo to the normal. When the dynamo-shaft attains the desired normal speed, the strength of the current passing through the solenoid-coil energizes the latter sufficiently to raise the core to a neutral position in which the reversing device is inactive and the shifting-screw is arrested. If the output of the dynamo is augmented by an increased speed of the car-axle and dynamo-shaft beyond what is necessary for the load on the work-circuit, the energization of the solenoid is increased and its core is raised high enough to operate the reversing device and reverse the direction of rotation of the shifting-screw, whereby the dynamo is shifted toward the car-axle, so as to slacken the belt and permit it to slip, thus decreasing the speed of the dynamo-shaft and decreasing the output to the normal. When the driving-axle and dynamo again slow down to a predetermined speed below the normal, the switch-blade $m$ leaves the contacts $s$ $s'$ and opens the motor-circuit, thereby throwing the motor and shifting mechanism out of action, while the dynamo continues to supply the lights and battery. Thus considerable unnecessary wear on the shifting mechanism is avoided.

I claim as my invention—

1. The combination of a driving element having a variable speed, a generator movable relative to said driving element to vary the speed of the generator, a drive connection between said driving element and the generator, a circuit supplied by the generator, an electrically-operated device for causing the relative movement of the generator, a normally open controlling-circuit for said electrically-operated device, and means for closing said controlling-circuit for the electrically-operated device after said other circuit is closed, substantially as set forth.

2. The combination of a driving element having a variable speed, a generator movable relative to said driving element to vary the speed of the generator, a drive connection between said driving element and the generator, a normally open circuit supplied by the generator, a normally inoperative electric motor for causing the relative movement of the generator, and means for closing said circuit supplied by the generator and thereafter setting said motor in operation, substantially as set forth.

3. The combination of a driving element having a variable speed, a generator movable relative to said driving element to vary the speed of the generator, a drive connection between said driving element and the generator, a normally open circuit supplied by the generator, an electric motor for causing the relative movement of the generator, a normally open motor-circuit supplied by the generator, and means controlled by the speed of the generator for closing said circuits separately one in advance of the other, substantially as set forth.

4. The combination of a driving element having a variable speed, a generator movable relative to said driving element to vary the speed of the generator, a drive connection between said driving element and the generator, an electric motor and its operating-circuit for causing the relative movement of the generator, a work-circuit, and a circuit-closing device controlled by the speed of the dynamo which operates to first close the work-circuit and thereafter close the motor-circuit, substantially as set forth.

Witness my hand this 21st day of August, 1903.

MARCELLUS R. SHEDD.

Witnesses:
C. M. BENTLEY,
CHAS. W. PARKER